(12) United States Patent
Scherer et al.

(10) Patent No.: US 9,036,582 B2
(45) Date of Patent: May 19, 2015

(54) METHOD AND SYSTEM FOR EFFICIENT MANAGEMENT OF A TELECOMMUNICATIONS NETWORK AND THE CONNECTION BETWEEN THE TELECOMMUNICATIONS NETWORK AND A CUSTOMER PREMISES EQUIPMENT

(75) Inventors: Christoph Scherer, Bensheim (DE); Holger Ebling, Buettelborn/Worfelden (DE); Benjamin Prager, Gross-Gerau (DE); Christian Martens, Darmstadt (DE); Norbert Grund, Mainz (DE)

(73) Assignee: DEUTSCHE TELEKOM AG, Bonn (DE)

( * ) Notice: Subject to any disclaimer, the term of this patent is extended or adjusted under 35 U.S.C. 154(b) by 136 days.

(21) Appl. No.: 13/805,391

(22) PCT Filed: Jun. 21, 2011

(86) PCT No.: PCT/EP2011/003056
§ 371 (c)(1),
(2), (4) Date: Feb. 20, 2013

(87) PCT Pub. No.: WO2011/160811
PCT Pub. Date: Dec. 29, 2011

(65) Prior Publication Data
US 2013/0235822 A1   Sep. 12, 2013

Related U.S. Application Data

(60) Provisional application No. 61/356,796, filed on Jun. 21, 2010.

(30) Foreign Application Priority Data

Jun. 21, 2010   (EP) .................................... 10006413

(51) Int. Cl.
*H04W 4/00* (2009.01)
*H04W 76/02* (2009.01)
(Continued)

(52) U.S. Cl.
CPC ........... *H04W 76/02* (2013.01); *H04L 12/2887* (2013.01); *H04L 41/0806* (2013.01); *H04L 41/32* (2013.01); *H04L 43/028* (2013.01); *H04L 63/0876* (2013.01)

(58) Field of Classification Search
CPC ..... H04W 80/04; H04W 88/06; H04W 28/04; H04W 72/04
USPC .................................................. 370/328, 329
See application file for complete search history.

(56) References Cited

U.S. PATENT DOCUMENTS

| 2003/0131107 A1 | 7/2003 | Godse et al. |
| 2008/0031227 A1 | 2/2008 | Wang |
| 2010/0202441 A1 | 8/2010 | Haag et al. |

FOREIGN PATENT DOCUMENTS

| CN | 101119250 A | 2/2008 |
| DE | 102007039516 A1 | 2/2009 |

(Continued)

OTHER PUBLICATIONS

Telecommunications and Internet converged Services and Protocols for Advanced Networking (TISPAN); NGN Security; Security Architecture, ETSI Draft; 07038-NGN-R3v320, Jun. 15, 2010 European Telecommunications Standards Institute (ETSI), Sophia-Antipolis ; France, Nr:V3.2.0, pp. 1-64.

(Continued)

*Primary Examiner* — Ronald Abelson
(74) *Attorney, Agent, or Firm* — Leydig, Voit & Mayer, Ltd.

(57) ABSTRACT

A method for efficient connection between a telecommunications network and a Customer Premises Equipment (CPE) via an access node includes: establishing a physical communication channel between the access node of the telecommunications network and the CPE; providing, by the telecommunications network, a public or private Internet Protocol address to the CPE for use by the CPE to communicate with an Internet Protocol Edge node of the telecommunications network; initially assigning, by the telecommunications network, a first functionality level to the public or private Internet Protocol address; and assigning, by the telecommunications network, a second functionality level to the public or private Internet Protocol address when the telecommunications network is able to federate the network access related identification information to a contract related identification information.

9 Claims, 4 Drawing Sheets

(51) Int. Cl.
H04L 12/28 (2006.01)
H04L 12/24 (2006.01)
H04L 29/06 (2006.01)
H04L 12/26 (2006.01)

(56) References Cited

FOREIGN PATENT DOCUMENTS

WO  WO 2005038598 A1  4/2005
WO  WO 2005038598 A2  4/2005

OTHER PUBLICATIONS

Telecommunications and Internet converged Services and Protocols for Advanced Networking (TISPAN); NGN Functional Architecture, ETSI Draft; 17bTD329, Feb. 9, 2009 European Telecommunications Standards Institute (ETSI), Sophia-Antipolis ; France Nr:V3.0.0, pp. 1-35.
Telecommunications and Internet converged Services and Protocols for Advanced Networking (TISPAN); NGN Functional Architecture; Network Attachment Sub-System (NASS), ETSI Standard, Mar. 1, 2010 European Telecommunications Standards Institute (ETSI), Sophia-Antipolis ; France, vol. TISPAN 2, Nr:V3.4.1, pp. 1-52.
Telecommunications and Internet converged Services and Protocols for Advanced Networking (TISPAN); Resource and Admission Control Sub-System (RACS): Functional Architecture, ETSI Standard, Apr. 1, 2010 European Telecommunications Standards Institute (ETSI), Sophia-Antipolis ; France, vol. TISPAN 2, Nr:V3.4.2, pp. 1-182.
Copeland, Rebecca, Converging NGN Wireline and Mobile 3G Networks with IMS: Converging NGN and 3G Mobile—Chapter Network Admission, Dec. 22, 2008 Auerbach Publications 2008—ISBN 978-1-4200-1378-8 ; ISBN 420013787, pp. 117-155.
"$3^{rd}$ Generation Partnership Project; Technical Specification Group Services and System Aspects; 3G security; Access security for IP-based services (release 10)" 3GPP Standard; 3GPP TS 33.303, $3^{rd}$ Generation Partnership Project, Sophia-Antipolis Cedex, France, No. V10.0.0, Jun. 16, 2010, pp. 1-114.
Garcia, Yolanda, "DSL fernkonfiguriert" Dec. 5, 2007, pp. 1-14.
European Patent Office, International Search Report in International Patent Application No. PCT/EP2011/003056 (Oct. 19, 2011).
European Patent Office, Extended European Search Report in European Patent Application No. 10006413.0 (Apr. 20, 2011).
Telecommunications and Internet converged Services and Protocols for Advanced Networking (TISPAN); NGN Management, IEEE, Jan. 1, 2005 LIS, Sophia Antipolis CEDEX, France, pp. 1-18.
Baseline capabilities for enhanced global identity management trust and interoperability, Sep. 25, 2009 International Telecommunication Union, Geneva ; CH, pp. 1-26.
Oostdijk, et al., User-Centric Identity using ePassports, Proceedings of International Conference in Communication Networks (SecureComm), Oct. 26, 2009, pp. 296-310.
Telecommunications an Internet converged Services and Protocols for Advanced Networking (TISPN); NGN Functional Architecture, ETSI ES 282 001, Section 2.1, Chapter 4, and Annexes A and C (Sep. 30, 2009).
Telecommunications and Internet converged Services and Protocols for Advanced Networking (TISPN); NGN Security; Security Architecture, ETSI TS 187 003, Chapter and D.1 (Feb. 28, 2009).
Telecommunications and Internet converged Services and Protocols for Advanced Networking (TISPAN); NGN Management; OSS vision; ETSI TR 188 004, V.1.1.1 Chapter 3, Chapter 5, Section 6.3, and Section 7.5 (May 31, 2005).
Telecommunications and Internet converged Services and Protocols for Advanced Networking (TISPAN); NGN Functional Architecture; Network Attachment Subsystem (NASS); ETSI ES 282 004 V3.4.1 Mar. 2010, Section 5.2, Section 5.6, and Chapter 7 (Mar. 31, 2010).
ITU-TX.1250, Baseline capabilities for enhanced global identity management and interoperability, Chapter 3, Chapter 7.1, Chapter 7.2, and Chapter 7.5.1 (Sep. 30, 2009).

METHOD AND SYSTEM FOR EFFICIENT MANAGEMENT OF A TELECOMMUNICATIONS NETWORK AND THE CONNECTION BETWEEN THE TELECOMMUNICATIONS NETWORK AND A CUSTOMER PREMISES EQUIPMENT

CROSS-REFERENCE TO RELATED APPLICATIONS

This application is a U.S. National Phase application under 35 U.S.C. §371 of International Application No. PCT/EP2011/003056, filed on Jun. 21, 2011, and claims benefit to U.S. Provisional Application No. 61/356,796, filed on Jun. 21, 2010, and to European Application No. EP 10006413.8, filed on Jun. 21, 2010. The International Application was published in English on Dec. 29, 2011 as WO 2011/160811 under PCT Article 21(2).

FIELD

The present invention relates to a method and a system for efficient management of a telecommunication network and the connection between this telecommunications network and a customer premises equipment.

BACKGROUND

From U.S. Pat. No. 7,127,049, a system enhancing automation of activating network service between a customer modem and a central office modem over a digital subscriber line link is known. In the system according to this prior art, the central office modem couples the customer modem to a network for providing the network service, the system comprising a polling system coupled with the central office modems.

Furthermore, TS 33.203 of the third Generation Partnership Project (3GPP), Access security for IP-based services (Release 10), 16 Jun. 2010 discloses a method for establishing a connection between an access node of a telecommunications network and a User Equipment.

Such known systems have a number of drawbacks. For example, due to the polling system defining a certain time period during which no network access is possible for the customer modem. Furthermore, the known systems relay on the provisioning of a session assigned Internet Protocol address which cannot be used permanently and therefore necessitates the reconnection of the connection between the customer modem and the communications network (by possibly another Internet Protocol address) and thus possibly a disconnection step and/or the initiation of new session and/or a reboot operation of the customers equipment.

Furthermore, according to the prior art, in order to establish the Internet Protocol connection between, on the one hand, the Internet Protocol Edge node and, on the other hand, the User Equipment like a customer modem or a CPE (Customer Premises Equipment), it is always necessary to use—as an authentication information—an information that is used or distributed in an untrusted environment. For example, CPE units are pre-configured in a user-specific manner and distributed to a plurality of customers or the customer hast to configure the CPE with credentials he got from the operator of the telecommunications network. Such pre-configuration information is not inherently secure or trusted because, due to the steps occurring prior to the establishment of an Internet Protocol session according to the prior art, the telecommunications network operator necessarily needs to distribute such credentials or pre-configuration or other (previously trusted) information in an untrusted environment or to an untrusted environment (e.g. customers household).

These limitations have the effect that the connection between the CPE on the one hand and the telecommunications network on the other hand is comparably time consuming or inherently insecure or at least involving an enormous logistical effort, e.g. for the distribution and/or updating of user credentials and/or pre-configured CPE equipment. Furthermore, the user has to type in credentials to access the network. There is no plug and play solution to access the network and services provided to the network connectivity.

Furthermore, German patent publication DE 10 2007 039 516 A1 discloses a method for configuring a communication port in a user-specific manner, the method comprising the step of providing a default profile, the default profile being directed to a specific user, and the method further comprising the step of assigning the user-specific default profile to a user-specific configuration profile, the user-specific configuration profile being assigned to a specific user.

SUMMARY

In an embodiment, the present invention provides a method for efficient connection between a telecommunications network and a Customer Premises Equipment (CPE) via an access node. The method includes: establishing a physical communication channel between the access node of the telecommunications network and the CPE, the physical communication channel being assigned to a network access related identification information related to the access node; providing, by the telecommunications network, a public or private Internet Protocol address to the CPE for use by the CPE to communicate with an Internet Protocol Edge node of the telecommunications network, the Internet Protocol address being associated with the network access related identification information and an Internet Protocol session or connection realizing a logical communication channel being initiated between the Internet Protocol Edge node of the telecommunications network and the CPE; initially assigning, by the telecommunications network, a first functionality level to the public or private Internet Protocol address; and assigning, by the telecommunications network, a second functionality level to the public or private Internet Protocol address when the telecommunications network is able to federate the network access related identification information to a contract related identification information. The logical communication channel is established by using at least one piece of authentication information, the at least one piece of authentication information being a trusted information existing within the telecommunications network.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
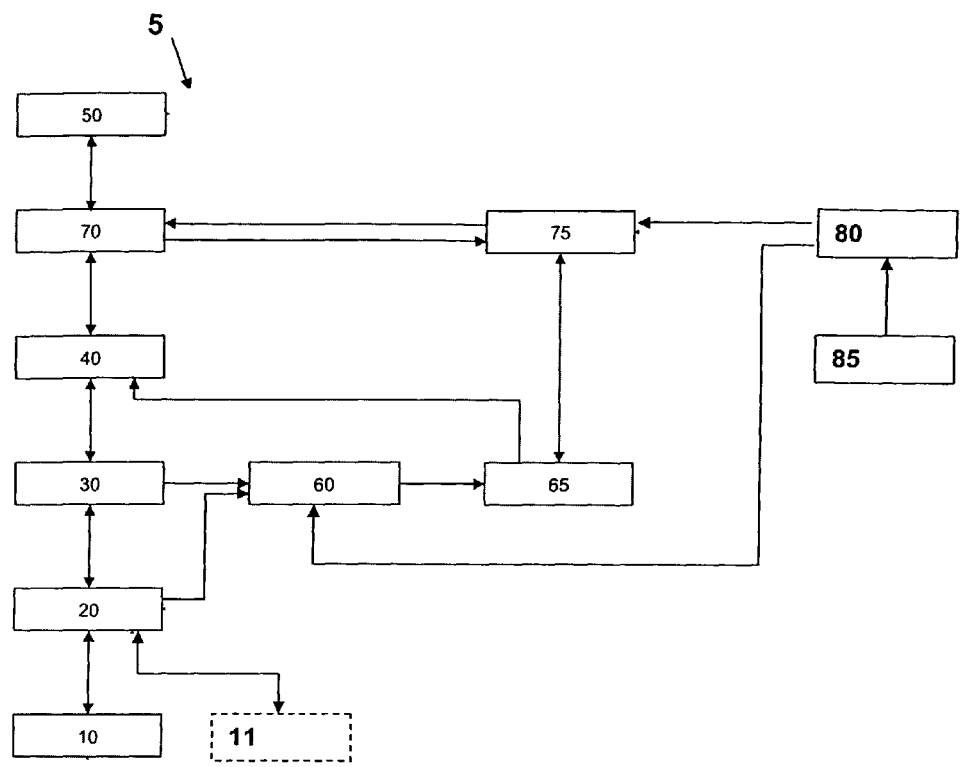
FIG. 1 illustrates schematically an example of a telecommunications network with a connected CPE.

Embodiments of the present invention provide a system and a method for efficient management of a telecommunications network and the connection between this telecommunications network and a customer premises equipment (CPE) by means of providing a communication channel between the telecommunications network and a CPE and by providing a control of the telecommunications network such that a flexible usage of telecommunications services is possible to the user, requiring only a minimum of time delay for configuring the telecommunications service without the necessity to configure the CPE itself, and a high or higher security level is achieved than by methods according to the prior art.

In an embodiment, the present invention provides a system such that managing the authorization of the IP connectivity to connect to several telecommunication services is independent from the IP connectivity itself.

Embodiments of the present invention provide a method and a system for efficient management of a telecommunications network and the connection between a telecommunications network and a CPE via an access node, especially for an efficient establishing and/or configuring of a connection between an Internet Protocol Edge node or an access node of a telecommunications network and a CPE, the method comprising the steps of:

establishing a physical communication channel between the access node of the telecommunications network and the CPE, the physical communication channel being assigned to a network access related identification information related to the access node, the telecommunications network providing a public or private Internet Protocol address to the CPE for use by the CPE to communicate with the Internet Protocol Edge node of the telecommunications network, the Internet Protocol address being associated with the network access related identification information and an Internet Protocol session (IP session) or connection realizing a logical communication channel being initiated between the Internet Protocol Edge node of the telecommunications network and the CPE, the telecommunications network initially assigning a first functionality level to the public or private Internet Protocol address (or to the logical communication channel), e.g. in the form of a walled garden, the telecommunications network assigning a second functionality level to the Internet Protocol address (or to the logical communication channel), in case that the telecommunications network is able to federate the network access related identification information to a contract related identification information wherein the logical communication channel is established by using at least one piece of authentication information, the at least one piece of authentication information being a trusted information existing within the telecommunications network, wherein preferably the at least one piece of authentication information exists within the telecommunications network on the access node port where the CPE is physically connected to.

Embodiments of the present invention provide a method and a system for efficient management of a telecommunications network and the connection between an access node of a telecommunications network and a CPE, especially for an efficient establishing and/or configuring of a connection between an access node of a telecommunications network and a CPE, the method comprising the steps of:

establishing a physical communication channel between the access node of the telecommunications network and the CPE, the physical communication channel being assigned to a network access related identification information, the telecommunications network providing a public or private Internet Protocol address to the CPE for use by the CPE to communicate with the IP network of the telecommunications network, the Internet Protocol address being associated with the network access related identification information, the telecommunications network initially assigning a first functionality level to the public or private Internet Protocol address (e.g. in the form of a walled garden), the telecommunications network assigning a second functionality level to the Internet Protocol address, in case that the telecommunications network is able to federate the network access related identification information to a contract related identification information.

The physical communication link between the access node of the telecommunications network and the CPE can be any wireline communication link. Such a wireline communication link usually comprises an end connected to the CPE and an end connected to the access node of the telecommunications network. The access node according to the present invention is defined as any device terminating the access network, that is part of the telecommunications network, and the home network. The CPE is to be understood as a customer premises equipment like a home gateway having a router functionality or any other device capable to establish an IP connectivity and being connected to the physical communication link, e.g., by means of being linked (or plugged) to a transfer point or a building entrance interface. The physical communication link between the access node and the CPE is also often referred to as the "last mile" (between the network components of the access network and the customer premises equipment. It is to be understood that the term "physical communication link between the access node of the telecommunications network and the CPE" does not need to be an individual wireline communication link between the CPE and the access node but can also be realized by means of an active device (e.g. ONU/ONT or Cable Modem) the CPE is connected if a shared medium is used such as an optical fiber network based on GPON, a cable network or the like. Even a (partial) use of a wireless communication link such as a point-to-point radio system (or directional radio link) between the access node of the telecommunications network and the CPE is to be understood as being a "physical communication link" in the sense that such a physical communication link comprises an end connected to the CPE and an end connected to the access node of the telecommunications network.

Examples of a wireline communication link include a communication link via a pair of copper lines or a communication link via an optical fiber link or a communication link via a cable television access link. In case a communication link via a pair of copper lines is used, the CPE is, e.g., linked to the telecommunications network by means of a so-called TAE (Telekommunikations Anschluss Einheit), APL (Abschlusspunkt Linientechnik, access point line technology or transfer point) and the pair of copper lines runs between the TAE/APL (in the subscribers home) to a Digital Subscriber Line Access Multiplexer (DSLAM) serving as access node of the telecommunications network. In case a communication link via an optical fiber link is used, the CPE is, e.g., linked to the telecommunications network by means of a so-called ONU (Optical Network Unit) or ONT (Optical Network Termination) and the optical fiber link runs between the ONU/ONT (in the subscribers home) to an OLT (Optical Line Terminal) serving as access node of the telecommunications network. In case a communication link via cable television access link is used, the CPE is, e.g., linked to the telecommunications network by means of a so-called CM (Cable Modem) and the cable television access link runs between the CM (in the subscribers home) to an CMTS (Cable Modem Terminal System) serving as access node of the telecommunications network.

According to the present invention, the logical communication channel is established between the Internet Protocol Edge node and the CPE. The logical communication channel corresponds to an Internet Protocol session or connection. The physical communication channel (between the telecommunications network and the CPE) is established between the access node and the CPE. It is possible and preferred according to all embodiments of the present invention that the functionality of the Internet Protocol Edge node is at least partly integrated into the network node having the functionality of the access node or vice versa (i.e. that the functionality of the access node is at least partly integrated into the network node having the functionality of the Internet Protocol Edge node).

According to the present invention, the logical communication channel between the Internet Protocol Edge node and the CPE (the Internet Protocol connection) is established by using at least one piece of authentication information, the at least one piece of authentication information being a trusted information existing within the telecommunications network, especially on the access node or access node port where the CPE is physically connected to. This means in the context of the present invention that, in order to establish a completely functional Internet Protocol session or connection (i.e. the logical communication channel between the Internet Protocol Edge node and the CPE), no distribution of credentials or personalized pre-configured CPE devices are necessary. It is only necessary that the telecommunications network, i.e. a control unit or a control function, knows about the existence of a specific port of the access node (and Line ID) and that a CPE, i.e. an arbitrarily configured CPE, is connected physically to the specific port of the access node. Based on these technical conditions, an Internet Protocol session or connection is possible to be established for the CPE. According to the present invention, initially, this Internet Protocol connectivity or Internet Protocol session (i.e. the logical communication channel) is preferably only functional based on the first functionality level. Upon exchanging the contract related information, the activation of the second functionality level is possible.

According to a preferred embodiment of the present invention, the at least one piece of authentication information is independent from the CPE, and the at least one piece of authentication information is related solely to either the access node or to other parts of the telecommunications network.

Thereby, it is advantageously possible to reduce the logistical effort for distributing the CPE devices to customers, for pre-configuring of CPE devices or handling the at least one piece of authentication information, i.e. especially credentials or credential information, as prerequisite for an Internet Protocol session or connection.

According to a preferred embodiment of the present invention, the network access related identification information corresponds to or is a so-called line ID. The network access related identification information or the line ID represents the physical communication channel. The physical communication channel is necessarily located, i.e. leads from a specific access node to a specific transfer point (or vice versa), and therefore allows for the possibility to assign to the physical communication channel not only its identity (network access related identification information) but also its location, e.g. in the form of an postal address or in the form of specifying a specific apartment inside an apartment building. The location of the physical communication channel preferably relates primarily to its remote end (i.e. the customer premise or the starting point of the physical communication link between the CPE and the access node). A so-called network port identification information, hereinafter also called port ID identifies the port of the access node which is connected to the physical connection towards the CPE. It is possible according to the present invention to associate a line ID (i.e. the network access related identification information) to the port of an access node, so both identifiers can be transported within technical protocols in the telecommunication network.

After an initial request of the CPE to the access node for requesting a telecommunications network service (i.e. for establishing a data transmission connection), the access node complements the request of the CPE by the information elements of the line ID and of the port ID. This is preferably done via the DHCP protocol (Dynamic Host Configuration Protocol), preferably using DHCP option 82 or PPPoE (Point-to-Point Protocol over Ethernet), preferable using PPPoE intermediate agent.

The telecommunications network preferably comprises a so-called Internet Protocol Edge node. The Internet Protocol Edge node administers the distribution of Internet Protocol addresses towards the CPE as well as different functionality levels associated with different Internet Protocol addresses the CPE can address. Hence, the Internet Protocol Edge node can be understood as being a routing device having a plurality of access and permission rules associated with different Internet Protocol addresses on different virtual interfaces. An Internet Protocol address given to the CPE having a reduced functionality level, e.g., is only permitted to a limited access range of target Internet Protocol addresses. An Internet Protocol address having an increased functionality level, e.g., is permitted to an enhanced access range of target Internet Protocol addresses with e.g. a default route to the internet.

According to the present invention, there are a number of different functionality levels that can be associated or assigned to an Internet Protocol address given to the CPE: A reduced functionality level is available to any functional physical communication channel between any port of an access node of the telecommunications network and any associated CPE operational with this kind of access node. Such a reduced functionality level is used according to the present invention to provide a basic connectivity with no relationship to a contract to enable the user behind this connectivity to use a default set of functionalities, e.g., a possibility to choose different access modes and/or different services offered by the operator of such services by accessing a customer self care interface.

An enhanced functionality level is associated with any service that can be delivered and is accessible by the physical communication channel especially by means of an Internet Protocol based network connection. Such services include but are not limited to an internet access service, a VoIP (voice over Internet Protocol) service, a VoD (video on demand) service, a television (TV) service or the like.

It is possible and preferred according to the present invention that a plurality of enhanced functionality levels exist, e.g. an enhanced functionality level with regard to internet access service can be provided simultaneously with a reduced functionality level regarding a multicast service such as television service (IPTV) or VoD.

According to one embodiment of the present invention, the initialization process of an Internet Protocol based service is described which means that the "first functionality level" refers to a reduced functionality level, especially the basic connectivity level, and that the "second functionality level" refers to an enhanced functionality associated with a certain kind of service delivery by the service provider after a reference to a contract related identification information (i.e. for example an authorization information) is made derived from a contract or at least related to a possible contract (in the future). This process is called "federation" in the context of the present invention. According to this embodiment, the first functionality level referring to such a reduced functionality level in the sense of a basic connectivity level for example only allows an entity accessing the network to be connected to a customer self care interface or another service or functionality aimed at configuring the network access. Such a reduced or basic connectivity level is also called "walled garden" in the context of the present invention.

According to another embodiment of the present invention, a change in the Internet Protocol based service configuration is described which means that the "first functionality level" refers to a functionality level prior to the change of service configuration and that the "second functionality level" refers to a functionality level after the change of service configuration. For example, the functionality level prior to the change of service configuration might include only VoIP or a functionality implementing services previously provided by the POTS system, and the functionality level after the change of service configuration might include VoIP or POTS functionality as well as internet access functionality (or the functionality level after the change of service configuration might include VoIP or POTS functionality as well as both internet access functionality and TV or VoD functionality.

According to another example, the functionality level prior to the change of service configuration might include VoIP or POTS functionality as well as access to a walled garden and the functionality level after the change of service configuration might include VoIP or POTS functionality as well as internet access functionality.

According to a preferred embodiment of the present invention, the telecommunications network comprises an Internet Protocol Edge node and a control function, wherein the contract related identification information to enable the second functionality level is sent to the control function after relating the network access related identification information to the contract related identification information by the federation process. In the control function, a set of authorization information is stored. Initially this set of authorization information in the meaning of "first functionality level" is a basic set of rights not derived from a contract. In a second step this authorization information in the meaning of "second functionality level" is changed. This is preferably done after relating a line ID (i.e. a network access related identification information) to a contract related identification information, e.g. an entity like a user holding the authorization information for services derived from a contract (federation), or after changing the authorization information related to this user by changing the existent contract or changing it because of other reasons (e.g. blocking the service because of abusive behavior).

In the context of the present invention, the term "contract related identification information" is related to an information that is either linked to an authorization information for services like internet service and/or a VoD service and/or a telephone (VoIP) service and/or a television over IP service) and/or other internet provider services like e-mail or portal services;

or linked to an authorization information derived from a pre-paid contract related to a specific service a user has with the service provider, or linked to an authorization information derived from another contractual or quasi-contractual relationship with the service provider such as a promotional offer, a voucher or the like.

According to another preferred embodiment of the present invention, the assignment of the second functionality level to the public or private Internet Protocol address is effected within 100 seconds from assigning the line ID and the entity holding the authorization information, preferably within 30 seconds, more preferably within 10 seconds, still more preferably within 3 seconds and most preferably within 1 second.

Thereby, it is advantageously possible to almost immediately configure the network parameters such that a modification of the service settings of a user can be used.

According to the present invention, it is preferred that the differentiation between different functionality levels is realized by the Internet Protocol Edge node by defining different ranges of Internet Protocol addresses that are potentially accessible by the CPE as well as other filters (e.g. Layer4). For content information that is not routed via the Internet Protocol Edge node, it is preferred according to the present invention that the Internet Protocol Edge node controls the associated telecommunications network elements (such as the access node) in order to allow or deny the access to such content information for a specified CPE like enabling or disabling the transport of multicast or even allow or deny the transport of a special kind of Ethernet frames.

According to the present invention, it is preferred that such a control of the associated telecommunications network elements (such as the access node) is realized via DHCP (dynamic host configuration protocol) or a DHCP based protocol or PPPoE (point to point over Ethernet).

According to the present invention, it is preferred that the Internet Protocol Edge node communicates with a control function of the telecommunications network in order to obtain authorization information. The authorization information is used by the Internet Protocol Edge node to associate a specific functionality level to the public or private Internet Protocol address provided to the CPE. The request of the authorization information is preferably based on the line ID as network access related identification information. According to the present invention, the control function is realized by means of a centralized authentication, authorization, and accounting (AAA) function or an associated AAA node. The authentication and/or authorization function associated with the control function is realized, e.g., by means of a RADIUS (Remote Authentication Dial In User Service (RADIUS)) server node or by means of a DIAMETER server node (or by means of a corresponding function realizing a RADIUS functionality). The control function provides information to the Internet Protocol Edge node that is related to the functionality level of the Internet Protocol address. This means that a memory is assigned to the control function (or a control node comprises the memory) such that the network access related identification information (e.g. the line ID) is associated to information relating to the specific functionality level associated to a certain contractual relationship of a user or to the person of a certain user. The information relating to the functionality level comprises, e.g., information regarding the potentially addressable range of Internet Protocol addresses and the allowed and/or usable bandwidth. Such information relating to the functionality level might be stored in the memory device associated with the control function in the form of so-called policies and/or in the form of dedicated single information and are used for the authorization of a request received by the control function from the Internet Protocol Edge node.

According to the present invention, it is preferred that the control function is able to force the Internet Protocol Edge node to implement changes in the functionality level even for a working connection having a working IP address. For example, this can be realized by means of a change of authorization request. According to the present invention, it is preferred that such a change in the functionality level (associated with a working connection of the CPE with the telecommunications network using the Internet Protocol address initially provided) is realized by means of a communication between the control function and the Internet Protocol Edge node. For example, the Internet Protocol Edge node acknowledges a command to restrict or expand the functionality level by means of an "Accounting Stop" message (in case an Internet Protocol connectivity already exists between the CPE and the Internet Protocol Edge) and a subsequent "Accounting Start" message towards the control function. This is preferable done without interrupting the Internet Protocol connectivity of the CPE.

According to the present invention, it is preferred that the initial provisioning of an Internet Protocol address for the connectivity of the CPE towards the telecommunications network (i.e. between the CPE and the access node) is realized by the Internet Protocol Edge node or by the control function.

According to the present invention, it is further preferred that the control function is able to return the following pieces of information related to a working Internet Protocol connectivity (or working Internet Protocol session):

line ID and port ID for each kind of communication link,
range of Internet Protocol addresses addressable by the CPE,
network parameter related to an Internet Protocol session
network parameter related to the physical attachment between the CPE and the access node like e.g. the sync bandwidth of a DSL subscriber line.

Alternatively, it is possible and preferred according to the present invention that instead of the line ID, a handle reference or a pointer reference is used. In case that the line ID is federated to a contract related identification information, an application IDP (application identity provider) referenced with the handle reference or pointer reference. This enhances data privacy if network and service operators (holding the contract for the IP services) are different legal entities. Especially in such a case (that network and service operators (holding the contract for the IP services) are different legal entities), it is preferred according to the present invention that the reference handle associated to the contract related identification information is a so-called opaque handle, i.e. an encrypted or otherwise masked information such that the content of the line ID cannot easily be derived from the opaque handle or encrypted or otherwise masked information.

According to the present invention, it is further preferred that the control function is able to establish an IP connectivity even no line ID is provided for authentication (e.g. in case of maintenance situations or the like). In this case, a special authorization profile has to be provided to the IP edge for basic communication between a user and the operator of the telecommunication network.

It is furthermore preferred according to the present invention that the telecommunications network comprises an operation support system and a data check function, wherein a data integrity check is performed comprising the following steps:

the CPE contacts the data check function,
the data check function retrieves from the CPE at least one integrity check information out of the following: the serial number of the CPE or of an associated device, MAC (Medium Access Control) addresses of the CPE or of an associated device,
the data check function retrieves from the control function network access related identification information and network port identification information related to the Internet Protocol session (IP session) or connection the CPE is connected to,
the integrity check information are transmitted to the operation support system to check against known changes within the telecommunications network.

Thereby, it is advantageously possible to realize an enhanced optimization of the network operation through the possibility to detect at least mayor changes in the manner of utilization the telecommunications network.

It is furthermore preferred according to the present invention that the contract related identification information is a user related identification information, especially specifying a person and preferably generated or retrieved by means of an RFID reader element, the RFID reader element being either associated to the CPE but preferably within the CPE.

Thereby, it is advantageously possible according to the present invention that by using an RFID enabled identification document such as an electronic passport, the contract related identification information can be generated using this RFID enabled identification information to create a customer relationship within a CRM system.

According to the present invention, it is further preferred that the telecommunications network comprises an operation support system and a network identity provider, the method comprising the establishment of a management communication channel between the access node and the operation support system, wherein the establishment of a physical communication channel between the access node of the telecommunications network and the CPE, the physical communication channel having a network access related identification information, and
the initial assignment of a first functionality level to the logical communication channel is realized by means of:
establishing a management communication channel between the access node and the operation support system,
transmitting to the operation support system the corresponding line ID, port ID, as well as further network parameters such as the maximum bandwidth physically possible at the corresponding network port, determining by the operation support system a technical status and a logical status of the corresponding network port, transmitting to the network IDP the corresponding line ID, technical status and logical status, as well as the location information related to the physical communication channel, generating a network port entry at the control function and transmitting authorization information specifying the first functionality level for a public or private Internet Protocol address managed by the Internet Protocol Edge node and usable via the network port of the access node of the telecommunications network.

Thereby, it is advantageously possible to easily and effectively provision a multitude of access nodes for providing network connection capability for an important number of users.

The present invention also relates to a method for efficient initialization of an access node in a telecommunications network, the telecommunications network comprising an operation support system and a network identity provider, the access node providing a plurality of network ports, the method comprising the establishment of a management communication channel between the access node and the operation support system, wherein the method comprises the following steps for at least a specific network port of the plurality of network ports of the access node, wherein the specific network port corresponds to a port ID:

transmitting to the operation support system the corresponding port ID, as well as further network parameters, especially the maximum bandwidth physically possible at the corresponding specific network port, and a line ID if existent, determining by the operation support system the technical status and the logical status of the corresponding specific network port, transmitting to the network IDP the technical status and logical status, as well as the location information related to a physical communication channel related to the corresponding specific network port, and the corresponding line ID if existent.

Thereby, it is advantageously possible to easily and effectively integrate a multitude of access nodes within a telecommunications network.

According to the present invention, it is further preferred that—during the step of transmitting to the network IDP the technical status and logical status, as well as the location information related to a physical communication channel related to the corresponding specific network port—the corresponding port ID is transmitted as line ID, especially in case that the line ID information is missing.

According to the present invention, it is especially advantageous that the initialization of the access node or the initialization of a port of the access node as well as the capability to establish an Internet Protocol session with at least the first functionality level does not rely on so-called inventory data. In the context of the present invention, inventory data are data that are generated, e.g., by technical staff, during the establishment or a check of nodes or entities of the telecommunications network, planning the network or a contract related information which could also be wrong. Such inventory data can either be wrong (i.e. initially wrong) or become wrong (i.e. being outdated due, e.g., to an updating process of a network component without taking into consideration follow-up changes) such that the network configuration process is interrupted or otherwise disturbed. This can lead to severe customer complaints due to time limits that are not respected (e.g. for the establishment of Internet Protocol connectivity) or the like.

The present invention also relates to a telecommunications network comprising a plurality of network nodes, the telecommunications network being provided for efficient connection between the telecommunications network and a CPE via an access node, wherein the telecommunications network comprises a physical communication channel between the access node of the telecommunications network and the CPE, the physical communication link being associated to a network access related identification information related to the access node, wherein the telecommunications network provides a public or private Internet Protocol address to the CPE for use by the CPE to communicate with the Internet Protocol Edge node, the Internet Protocol address being associated with the network access related identification information and an Internet Protocol session (IP session) or connection realizing a logical communication channel being initiated between the Internet Protocol Edge node of the telecommunications network and the CPE, wherein the telecommunications network initially assigns a first functionality level to the public or private Internet Protocol address, and wherein the telecommunications network assigns a second functionality level to the public or private Internet Protocol address, in case that the telecommunications network is able to federate the network access related identification information to a contract related identification information, wherein the logical communication channel between the Internet Protocol Edge node and the CPE according to the first functionality level is established by using at least one piece of authentication information, the at least one piece of authentication information being a trusted information existing within the telecommunications network.

The present invention furthermore also relates to a telecommunications network comprising a plurality of network nodes, the telecommunications network being provided for efficient connection between the telecommunications network and a CPE, via an access node, wherein the telecommunications network comprises a physical communication channel between the access node of the telecommunications network and the CPE, the physical communication link being associated to a network access related identification information related to the access node, wherein the telecommunications network provides a public or private Internet Protocol address to the CPE for use by the CPE to communicate with the Internet Protocol Edge node, the Internet Protocol address being associated with the network access related identification information and an Internet Protocol session (IP session) or connection realizing a logical communication channel being initiated between the Internet Protocol Edge node of the telecommunications network and the CPE, wherein the telecommunications network initially assigns a first functionality level to the public or private Internet Protocol address, and wherein the telecommunications network assigns a second functionality level to the public or private Internet Protocol address, in case that the telecommunications network is able to federate the network access related identification information to a contract related identification information.

Furthermore, the present invention relates to a telecommunications network comprising a plurality of network nodes, the telecommunications network being provided for efficient initialization of an access node in the telecommunications network, the telecommunications network comprising an operation support system and a network identity provider, the access node providing a plurality of network ports, the method comprising the establishment of a management communication channel between the access node and the operation support system, wherein for at least a specific network port of the plurality of network ports of the access node, the specific network port corresponding to a port ID, the telecommunications network provides for:

a transmission to the operation support system of the corresponding port ID, as well as further network parameters, especially the maximum bandwidth physically possible at the corresponding specific network port, and the line ID if existent, a determination by the operation support system of the technical status and of the logical status of the corresponding specific network port, a transmission to the network IDP of the technical status and logical status, as well as the location information related to a physical communication channel related to the corresponding specific network port, and the corresponding line ID if existent.

According to the present invention and with respect to the telecommunications network comprising a plurality of network nodes, it is furthermore also preferred that—during the transmission to the network IDP of the technical status and logical status, as well as the location information related to a physical communication channel related to the corresponding specific network port—the corresponding port ID is transmitted as line ID.

Furthermore, the present invention also relates to a telecommunications network comprising a plurality of network nodes, the telecommunications network being provided for efficient initialization of an access node in the telecommunications network, the telecommunications network comprising an operation support system and a network identity provider, the access node providing a plurality of network ports, the method comprising the establishment of a management communication channel between the access node and the operation support system, wherein for at least part of the network ports of the access node, the telecommunications network provides for:

a transmission to the operation support system of the corresponding line ID, port ID, as well as further network parameters such as the maximum bandwidth physically possible at the corresponding network port, a determination by the operation support system of the technical status and of the logical status of the corresponding network port, a transmission to the network IDP of the corresponding line ID, technical status and logical status, as well as the location information related to the physical communication channel, a generation of a network port entry at the control function and the transmission of authorization information specifying a first functionality level for a public or private Internet Protocol address usable by that network port to communicate with the access node of the telecommunications network.

The present invention further relates to a Customer premises equipment to be used with an inventive telecommunications network, wherein the Customer premises equipment comprises an RFID (radio frequency identification) reader element or the Customer Premises Equipment being connected to an RFID (radio frequency identification) reader element, wherein the contract related identification information is a user related identification information (especially specifying a person) and wherein the user related identification information is preferably retrieved by the RFID reader element or generated using the RFID reader element.

Further subjects of the present invention include a program comprising a computer readable program code for controlling an access node and/or a control function to perform an inventive method and a computer program product comprising such a program.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described of illustrated herein.

In FIG. 1, an example of a telecommunications network 5 with a connected customer is schematically represented. The customer is connected to the telecommunications network 5 using a so-called CPE or a dedicated CPE with capabilities to establish an IP connectivity like a PC, a settop box or any other device 10. The CPE 10 is, e.g., a routing device installed in the user's home. Further customer premises equipment (CPE) might be present connected to the CPE.

The CPE 10 is connected to the telecommunications network 5 via an access node 20. The access node 20 is preferably a Digital Subscriber Line Access Multiplexer (DSLAM) installed either in the building of the customer or installed at a distance of less than a few kilometers, preferably less than 1000 meters, more preferably less than 500 meters or an OLT (Optical Line Terminal) serving as access node of the telecommunications network.

The access node 20 is connected to an Internet Protocol Edge node 30 within the telecommunications network 5. The Internet Protocol Edge node 30 administers the distribution of Internet Protocol addresses as well as different functionality levels associated with different Internet Protocol addresses, the CPE can access. The Internet Protocol Edge node 30 can be understood as being a routing device having a plurality of access and permission rules regarding different Internet Protocol addresses on different virtual interfaces. Especially, the Internet Protocol Edge node 30 controls which addresses and functions are accessible by the CPE 10 on Layer 3 and Layer 4 of the OSI-Model.

The telecommunications network 5 further comprises a control function 40. According to the present invention, the control function 40 is realized by means of a centralized authentication, authorization, and accounting (AAA) function or an associated AAA node. The authentication and/or authorization functions associated with the control function 40 is realized, e.g., by means of a RADIUS (Remote Authentication Dial In User Service (RADIUS)) server node or by means of a DIAMETER server node (or by means of a corresponding function realizing a RADIUS functionality). According to the present invention, it is possible and preferred that—instead of the Internet Protocol Edge node 30—the control function 40 administers the distribution of Internet Protocol addresses as well as different functionality levels associated with different Internet Protocol addresses, the CPE can access.

The Internet Protocol Edge node 30 furthermore controls the session-accounting for the control function 40. Additionally, the Internet Protocol Edge node 30 is able to use an identifier information or a credential information, obtained or received from the access node 20, for authentication purposes with the control function 40. For authentication purposes, i.e. as a piece of authentication information, the line ID is used. Furthermore, the Internet Protocol Edge node 30 transmits the port ID from the access node 20. The Internet Protocol Edge node 30 furthermore controls the bandwidth (on an Internet Protocol level) for the upstream and downstream dataflow for one or more defined data classes.

According to a preferred embodiment according to the present invention, the Internet Protocol Edge node 30 manages or allocates the Internet Protocol addresses (IP-addresses) of the CPE 10 according to rules or rule information received by the control function 40 (especially received by the Internet Protocol Edge node 30 in return to an access request message to the control function 40).

The telecommunications network 5 further comprises an operation support system 60. The operation support system 60 is especially used to manage the different entities of the access network, i.e. the part of the telecommunications network 5 used to provide access to a comparably important number of users to the telecommunications network 5. Furthermore, the telecommunications network 5 comprises a network identity provider (hereinafter also called network IDP) 65. The network IDP 65 is especially used to handle managing of authentication and authorization for the different ports of one or a plurality of access nodes 20 out of the plurality of access nodes 20 of the telecommunications network 5. The operation support system 60 is linked to the access node 20 such as to be able to initialize the access node 20. The operation support system 60 provides a management connection to the access node 20, preferably by means of an Internet Protocol (IP) connection. This is, e.g., done by using a management address such as an Internet Protocol (IP) address which is specifically reserved for managing or initializing a specific access node 20.

The telecommunications network 5 further comprises an A&A function (authorization and authentication function) 70 for applications and/or an IMS functionality. The A&A function 70 is especially used to authenticate (i.e. the process where an entity's identity is authenticated, typically by providing evidence that it holds a specific digital identity such as an identifier and the corresponding credentials) and to authorize (i.e. whether a particular entity is authorized to perform a given activity) users and/or devices within the telecommunications network 5 towards an application and/or IMS.

Furthermore, the telecommunications network 5 comprises an application identity provider (hereinafter also called application IDP) 75. The application IDP 75 is especially used to handle the different users and/or devices of the telecommunications network 5. The application IDP 75 and the network IDP 65 are able to federate the contract related identification information (hereinafter also called a user identity or user ID) with the network access related identification information, i.e. the identity of a network termination location or a network port (e.g. the port of an access node) by means of a federation interface.

The telecommunications network 5 further comprises an application function or application entity 50 (especially an application of the Internet Protocol Multimedia Subsystem (IMS) system of the telecommunications network 5).

According to the present invention, the telecommunications network 5 preferably comprises a Customer Relation Management function 80 or a corresponding unit. Hereinafter, the term Customer Relation Management function 80 is used to refer to such a unit as well. The Customer Relation Management function 80 is provided as a function to create customer identities (for handling new customers) and corresponding contracts. The Customer Relation Management function 80 is the master of customer, product and contract data. The Customer Relation Management function 80 comprises or is assigned to a request or order management component (or order management function) like in the meaning of "Order Handling" and "Service Configuration and Activation" shown in the eTom model (not explicitly shown) that processes the different requests (e.g. related to the generation of a new customer data element or a fulfillment process) and forwards corresponding requests to other parts of the telecommunications network 5.

According to the present invention, it is furthermore preferred that the telecommunications network 5 also comprises a customer self care interface 85 or a customer self care portal 85. The customer self care portal 85 provides the possibility to a user (or customer) of the telecommunications network 5 to configure the network access.

According to the present invention, a configuration device 11 can be connected to the access node 20 for configuration and/or installation purposes. In normal operative use of the telecommunications network 5, the configuration device 11 is not connected to (all of) the access nodes 20.

Preferably, the customer self care portal 85 supports a user authentication against the application IDP and determines—as a prerequisite for a federation—the line ID that corresponds to the Internet Protocol address used during the authentication process against the control function 40. Preferably, it is possible that the federation process between a user ID and a line ID is also initiated:

by means of transmitting an order ID to the application IDP, the order ID being related to a user ID, and/or by means of transmitting an order ID to the network IDP, the order ID being related to a line ID.

Furthermore, a provisioning interface is preferably provided from the application IDP to the network IDP such that an update of the services accessible to a line ID (i.e. the functionality level associated to the IP address, e.g., assigned to a network port or to a CPE 10 or any other device connected to the access node 20) can be changed by means of the line ID or by means of a handle (preferably an opaque handle) to the line ID. According to the present invention, also a (complete or partial) de-federation between a user ID and a line ID (which results to i.e. a removal of the right to use a specific service or the reduction of rights or usable bandwidth) is possible, preferably by means of the customer self care portal. In the following, only the case of a federation is explicitly mentioned but the de-federation case is also possible according to the present invention.

The execution of the federation process necessitates a user ID or any other contract related information and a line ID. According to a first alternative of the federation process, an explicit user authentication (i.e. a determination of the user ID) is performed with the customer self care portal. By using a network resource to contact the customer self care portal, i.e. by using a network port of an access node 20, also the line ID is available when such a user authentication with the customer self care portal is performed. According to a second alternative of the federation process, the line ID is determined via a location search. Another search also provides a user ID (e.g. after asking the customer for his user name or any other known information assigned to the user ID like a special secret) or any other contract related information. Both the first and the second alternative of the federation process leads to the possibility to federate the user ID or any other contract related information and the line ID. The federation process as well as each later change relating to the services associated to a user ID or any other contract related information results in a request of the application IDP 75 to the network IDP 65. Thereby, the application IDP 75 uses preferably the line ID federated to the user ID or any other contract related information or a corresponding handle. As a result, the network IDP 65 performs an update of the stored data in (or associated with) the control function 40, namely:

an update of the permissions stored in a persistent database relating to the line ID, an update of the permissions stored in a session database relating to an existing Internet Protocol connection, e.g. by means of a change-of-authorization request to the Internet Protocol Edge node 30.

As a result of the federation process, line ID and user ID or any other contract related information are federated, the network IDP 65 and the control function 40 comprise an authorization information for each line ID related to the permitted network services (such as addressable Internet Protocol address ranges and usable bandwidth including the possibility to access a multicast replication point). The possibly existent Internet Protocol connection of a CPE 10 with an Internet Protocol Edge node 30 is re-parameterized. According to the present invention, it is preferably advantageous that it is possible to federate a user ID or any other contract related information with a line ID both by means of a 1 to 1 relationship and by means of a 1 to n relationship. This means that one and the same user can have network service access on a plurality of different line IDs.

Figure 2:
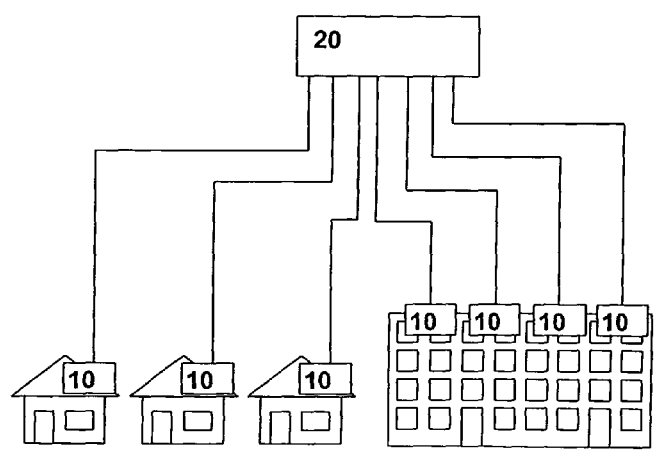
FIG. 2 illustrates schematically an example of a more detailed representation of physical communication channels between an access node and a plurality of home gateways.

In FIG. 2, an example of a more detailed representation of physical communication channels between an access node 20 and a plurality of home gateways 10 is schematically shown. As can be seen from the representation in FIG. 2, an access node 20 be (and preferably is) connected to a plurality of different home gateways 10, e.g. located in different homes. On the left hand side of FIG. 2, a plurality of individual houses are schematically represented. In each of these houses a home gateway 10 is located providing individual access to the telecommunications network 5. On the right hand side of FIG. 2, an apartment building is schematically represented having a plurality of different apartments and each apartment having a home gateway 10 providing individual access to the telecommunications network 5. The different lines running from the access node 20 to the home gateways 10 (of the houses or of the apartment building)

According to the present invention, the telecommunications network 5 is preferably provided as a so-called NGN (next generation network). Generally, NGN telecommunications networks 5 comprise four different planes or network layers, namely a first network plane 1 assigned to the access (access plane 1), a second network plane 2 assigned to the transport of data (transport plane 2), a third network plane 3 assigned to controlling (control plane 3), and a fourth network plane 4 assigned to the applications (application plane 4).

Figure 3:
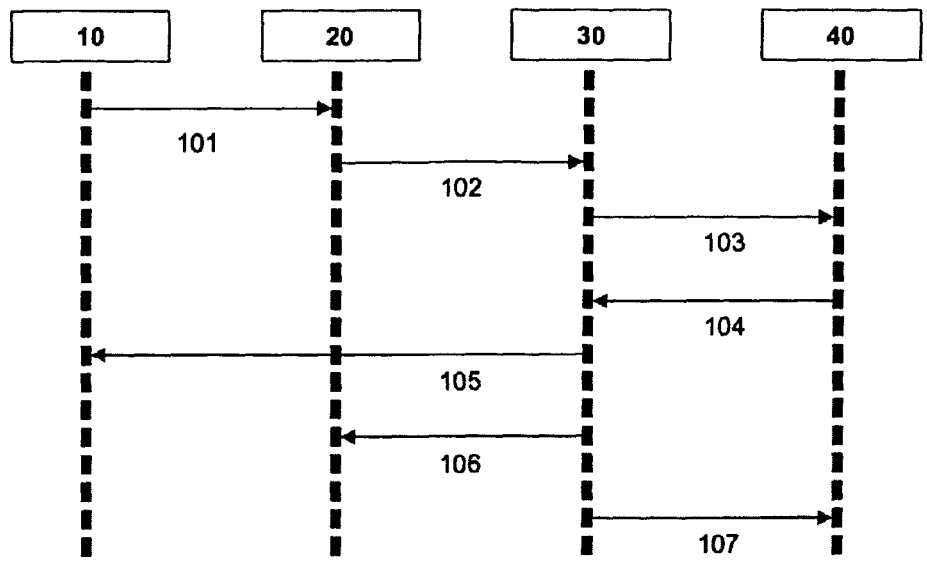
FIG. 3 illustrates schematically a communication diagram related to providing Internet Protocol connectivity to a CPE and initializing a communication service.

In FIG. 3, a communication diagram related to providing Internet Protocol connectivity to a CPE 10 and initializing a communication service is schematically illustrated by means of a multitude of different messages exchanged between the CPE 10, the access node 20, the Internet Protocol Edge node 30 and the control function 40.

In a first step of initially providing Internet Protocol connectivity to the CPE 10, the CPE 10 requests the provision of an Internet Protocol address to the access node 20. This is represented by a first message 101.

In a second step, the access node 20 adds further information to the request to provide an Internet Protocol address. The request with the added information is transmitted to the Internet Protocol Edge node 30. The added further information especially includes line ID and port ID information for the case of a wireline physical communication channel (this constitutes the trusted information according to the present invention as this information (line ID and port ID) is known in a trusted manner to the telecommunications network 5).

Besides the network access related identification information (or line ID), further information regarding especially network parameters can be added by the access node like physical connection speed for up- and downstream 20. This is represented by a second message 102.

In a third step, the Internet Protocol Edge node 30 sends an authorization request to the control function 40 based especially on the line ID. This is represented by a third message 103.

In a fourth step, the control function 40 retrieves or determines the authorization information related to the line ID in the request 103. The authorization information especially comprises information regarding ranges of Internet Protocol address that should be accessible to the CPE 10 as well as other filters (e.g. Layer4) including accessibility to multicast, and bandwidth information regarding allowed or authorized bandwidths (e.g. regarding the upload bandwidth and/or regarding the download bandwidth).

The retrieved or determined authorization information is returned by the control function 40 to the Internet Protocol Edge node 30 which is represented by a fourth message 104. In case that the provisioning of the Internet Protocol address assigned to the CPE is done by the Internet Protocol Edge node, the fourth message 104 does not comprise an indication about the Internet Protocol address assigned to the CPE 10. Alternatively, in case that the provisioning of the Internet Protocol address assigned to the CPE 10 is not done by the Internet Protocol Edge node, the provisioning of the Internet Protocol address to be used by the CPE is provided by the control function, and the fourth message 104 comprises an indication about the Internet Protocol address assigned to the CPE 10.

In a fifth step, the Internet Protocol Edge node provides for a realization of the Internet Protocol traffic routing according to the information received by the control function 40. Especially, the Internet Protocol Edge node sets the ranges of Internet Protocol addresses accessible to the CPE as well as other filters (e.g. Layer4) and the respective usable bandwidths in accordance with the information of the fourth message 104. Furthermore, by means of a fifth message 105, the Internet Protocol Edge node 30 provides an Internet Protocol address (to be assigned to the CPE 10 or to be used by the CPE 10) to the CPE 10. It is preferred according to the present invention, that the fifth message 105 also comprises additional network information such as the default gateway and/or the DNS-address (address of the domain name system, DNS).

In case that setting information contained in the fourth message 104 indicate that modifications regarding the settings of multicast replication parameters (usually done at the access node 20) are necessary, the Internet Protocol Edge node 30 provides such information to the access node by means of a sixth message 106.

In a seventh step, the Internet Protocol Edge node 30 sends a seventh message 107 to the control function 40. The seventh message 107 comprises an Accounting-Start-Request related to the Internet Protocol address to start a session at the control function 40.

In an eighth step, the control function 40 starts a session related to the Internet Protocol address and stores the Internet Protocol address assigned to the CPE, the ranges of Internet Protocol addresses accessible by the CPE as well as other filters (e.g. Layer4) or its correlated authorization information, line ID and port ID, as well as the network parameters describing the access node port capabilities.

As a result, an Internet Protocol connectivity is established between the CPE 10 and the telecommunications network:

the CPE 10 is equipped with an Internet Protocol address, i.e. an IP address, (dynamic or static) and all mandatory information are present at the CPE 10 in order to address arbitrary Internet Protocol addresses (if allowed by the purchased service or functionality level) and to dissolve host names to Internet Protocol addresses.

According to the present invention, it is advantageously possible to use a CPE device without comprising personalized credential information (i.e. information directly linked to a specific user or contract).

Figure 4:
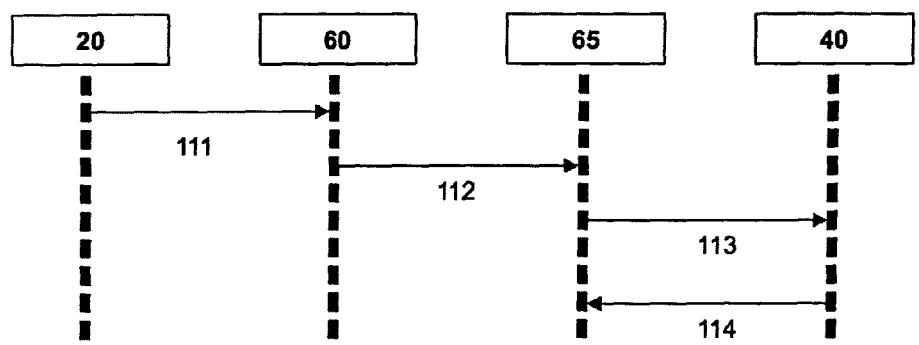
FIG. 4 illustrates schematically a communication diagram related to the initialization process for initializing an access node out of a plurality of access nodes of the telecommunications network in such a way that communication access and especially Internet Protocol connectivity of a CPE to the telecommunications network can be provided via the access node.

In FIG. 4, a communication diagram is shown which is related to the initialization process for effectively initializing an access node 20 out of a plurality of access nodes 20 of the telecommunications network 5 in such a way that communication access and especially Internet Protocol connectivity of a CPE 10 (and preferably a plurality of for example 10 or 100 or 1000 or 10000 CPEs 10) to the telecommunications network 5 can be provided via the access node 20. The communication diagram represents a multitude of different messages exchanged between the access node 20, the control function 40, the operation support system 60 and the network IDP 65.

In the case of initially setting up a telecommunications network to enable the Internet Protocol connectivity to one of the plurality of CPEs 10 connected to the access node to be initialized, the access node 20 is connected (in an eleventh step) to the operation support system 60 by means of a management communication channel. The management communication channel is, e.g., realized by means of using a management address such as an Internet Protocol management address. For each physical communication channel (to possibly a CPE 10 or another device) that the access node 20 (which is to be initialized by such a management communication channel) is able to provide, the access node 20 is able to transmit to the operation support system 60 the following pieces of information: the line ID, the port ID, the status of the physical communication channel, as well as further network parameters such as the maximum bandwidth physically possible. This is represented by an eleventh message 111. Based on the information received by the access node 20 with respect to a specific physical communication channel, the operation support system 60 is able to get the port ID or configure the port ID from/to a port of an access node, configure the line ID to a port represented by the port ID, configure physical limits of the available bandwidth as well as other parameters. Furthermore, the operation support system 60 is able to store the location information (related to the physical communication channel) related to the line ID. In case no line ID is available, the operation support system 60 can provide a configuration such that the line ID is equal to the port ID. Alternatively to realizing the configuration such that in case of an unavailable line ID the port ID and the line ID are set to be equal, it is also possible to not specify the line ID. In such a case, if the control function 40 receives a request regarding a physical communication channel (or network port) having no specified line ID or an unknown line ID, the control function does not reject such a request but grants network access in a limited fashion, e.g. according to a configuration and installation functionality level or a fault policy, i.e. only permitting a maintenance functionality (i.e. a functionality level even more reduced than the functionality level previously referred to providing a basic connectivity (with no relationship to a contract and to enable to use customer self care capabilities)—called "first functionality level").

The process of initializing the access node 20 means that the operation support system 60 detects (or discovers) the technical status as well as the logical status of each network port (or physical communication channel) of the access node 20, or that the operation support system 60 detects (or discovers) the technical status as well as the logical status of at least the majority of the network ports (or physical communication channels) of the access node 20. As this initializing process of the access node 20 can be performed automatically, this process is also called autodiscovery of the access node 20 or autodiscovery of the network ports of the access node 20.

According to the present invention, it is preferred that the operation support system 60 knows at least the following possibilities regarding the technical status of a network port (or physical communication channel):

network port is available ("OK"), i.e. there is no error detected associated with the physical communication channel or network port;

network port is not available ("not OK"), i.e. there is an error detected associated with the physical communication channel or network port;

network port is busy ("Sync"), i.e. there is a connection established between the network port of the access node 20 and, e.g., a CPE 10.

According to the present invention, it is preferred that the operation support system 60 knows at least the following possibilities regarding the logical status of a network port (or physical communication channel):

network port is provisioned ("Provisioned"), i.e. the information regarding the port ID, the location and the line ID are present at the operation support system 60;

network port is not provisioned ("unprovisioned"), i.e. the information regarding the port ID is present at the operation support system 60 but not the information regarding the line ID (according to one embodiment of the present invention but not necessarily, this results in setting the line ID equal to the port ID).

In a twelfth step, the operation support system 60 transmits the line ID information, the location information as well as the information regarding the technical and logical status of the different network ports of the initialized access node 20 to the network IDP 65. This is represented by a twelfth message 112.

In a thirteenth step, a message is sent to the control function 40 requesting the generation of a (new) network port entry in a memory unit of the control function 40 or assigned to the control function 40. The new network port entry represents the network port newly discovered by the telecommunications network 5 or newly integrated in the management of the telecommunications network 5 by means of the initialization process of the access node 20. The thirteenth step is represented by a thirteenth message 113. The thirteenth message 113 is preferably sent by the network IDP 65. In an optional fourteenth step, the control function 40 acknowledges the generation of the network port entry. This is represented by a fourteenth message 114.

As a result, the access node 20 is configured or initialized to use a newly discovered network port, i.e. allowing a new physical communication channel between the access node 20 and a CPE 10. The operation support system 60 knows the technical and logical status of the network ports of the access node 20 as well as line ID, port ID, location and further network parameter. The network IDP 65 knows the technical and logical status of all the network ports at the newly initialized and configured access node 20 as well as the line ID and location related to the line ID; furthermore, the network IDP 65 has detected which one of the network ports is potentially federable (i.e. can be federated) and which one of the network ports is already federated. The control function 40 knows about all line IDs (and network ports) of the network IDP 65 together with the corresponding authorization information for the Internet Protocol ranges addressable by the CPE 10 as well as other filters (e.g. Layer4) and the possible bandwidth. According to the present invention, it is always possible to provide an IP-connectivity. In case that only a port ID is available, such IP-connectivity is only available for internal uses (of the telecommunications network). In case that additionally a line ID is available, IP-connectivity is also available according to a default policy (first functionality level), providing access to a walled garden, from a CPE 10 linked to the access node 20.

Figure 5:
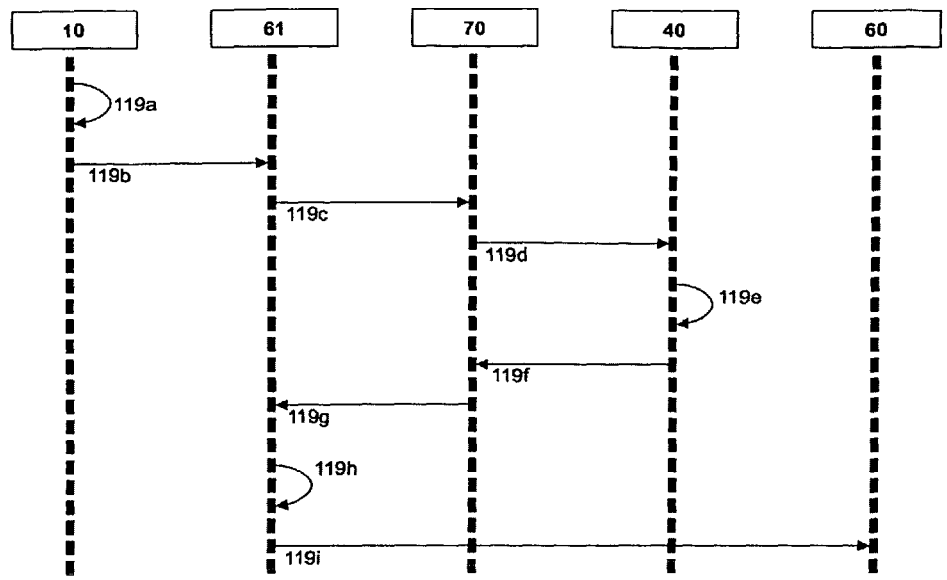
FIG. 5 illustrates schematically a communication diagram related to performing a data integrity check.

In FIG. 5, a communication diagram related to performing a data integrity check is schematically represented. With respect to the description of FIG. 5, a first to a ninth step and corresponding first to ninth messages or processings 119a to 119i are mentioned which only refer to the description of FIG. 5.

In FIG. 5, the communication diagram related to performing a data integrity check is schematically illustrated by means of a multitude of different messages exchanged between the CPE 10, the A&A function 70, the control function 40, the operation support system 60 and a data check function 61. The data check function 61 is preferably realized by means of a TR-069-Server or TR-069 unit. TR-069 (short for Technical Report 069) is a technical specification entitled CPE WAN Management Protocol (CWMP). It defines an application layer protocol for remote management of end-user devices. As a bidirectional SOAP/HTTP based protocol it provides the communication between customer-premises equipment (CPE) and Auto Configuration Servers (ACS). It includes both a safe auto configuration and the control of other CPE management functions within an integrated framework. During operation of the telecommunications network 5 (i.e. telecommunications services are requested by the CPE 10 and provided by the telecommunications network 5), it is preferred according to the present invention that the CPE 10 regularly connects to the data check function 61 and transmits the serial number and/or the MAC-addresses of either only the CPE 10 or of the CPE 10 and additionally the connected devices such as computers, routers, hard disk devices or the like as a "home fingerprint". The data check function 61 checks these data and is able to detect changes in the configuration of the CPE 10 and/or of the CPE 10 and associated or connected devices. Furthermore the data check function 61 retrieves the line ID information (or the corresponding handle) and/or the port ID information (or the corresponding handle) related to the Internet Protocol session (IP session) or connection the CPE (10) is connected to from the control function (40) and detects any kind of change in the combination of the collected information.

Such changes are reported to the operation support system 60 to check against known changes within the telecommunications network.

In a first step, involving a processing 119a, the CPE 10 detects or retrieves the relevant information (serial numbers, MAC addresses or the like of the components of the home network preferably including the serial numbers and MAC address of the CPE itself). In a second step, involving a second message 119b, the CPE 10 transmits the information detected in the first step to the data check function 61. In a third step, involving a third message 119c, the data check function 61 request the line ID and the port ID at the A&A function 70. In a fourth step, involving a fourth message 119d, the A&A function 70 forwards the message requesting the line ID and the port ID to the control function 40. In a fifth step, involving a processing 119e, the control function 40 retrieves the line ID and the port ID corresponding to the Internet Protocol address. In a sixth step, involving a sixth message 119e, the control function 40 returns the line ID and the port ID to the A&A function 70. In a seventh step, involving a seventh message 119g, the A&A function 70 returns the line ID and the port ID to the data check function 61. In an eighth step, involving a processing 119h, the data check function 61 detects whether a change of the configuration of the CPE10 and/or associated devices of the home network have occurred und updates a configuration databases regarding these information. In a ninth step, involving a ninth message 119i, the data check function 61 sends a report message to the operation support system 60 in case that a change in the configuration of the CPE 10 (or the associated devices) has occurred or in case that a sufficiently large change in the configuration of the CPE 10 (or the associated devices) has occurred.

For example and according to a preferred embodiment of the present invention, no report message to the operation support system 60 occurs in case that only the serial number of the CPE 10 or an associated device is changed but the MAC address is unchanged (as such an event is interpreted as only an exchange of the CPE 10 or an associated device). In such an embodiment of the present invention a report message to the operation support system 60 would, e.g., occur in case that both the serial number of the CPE 10 or an associated device and the MAC address of the CPE 10 or an associated device is changed. According to another preferred embodiment of the present invention, a report message to the operation support system 60 occurs also in case that only the serial number of the CPE 10 or an associated device is changed (but the MAC address is unchanged). Thereby, it is possible to plausibilize the exchange of the CPE 10 initiated by the telecommunications network 5.

As a result, changes in the use of the telecommunications network 5 can be recognized and thereby further changes or events (e.g. relating to the contractual situation of a user) can be validated.

According to a preferred embodiment of the present invention, the contract related identification information is a user related identification information, especially specifying a person. By means of using a CPE 10 such that the CPE 10 either comprises an RFID (radio frequency identification) reader element or that the CPE 10 is connected to an RFID (radio frequency identification) reader element, it is possible to generate or to retrieve the contract related identification information in the form of a user related identification information specifying a person and retrieved by the RFID reader element. Thereby, it is advantageously possible according to the present invention that the hardware of the CPE 10 is realized completely without any credential information and that the authentication is exclusively done via the contract related identification information being retrieved from or generated from an identification information contained, e.g., in an electronic passport or in an identity card having an RFID capability. An example of such a functionality is given hereinafter: In case that an Internet Protocol connection is established (with the first functionality level) between the telecommunications network 5 and a CPE 10, the CPE 10 or its user can access a customer self care portal. Via an RFID reader element (either integrated in the CPE 10 or integrated in another device connected to the CPE 10), an application for controlling the RFID reader element can be used to retrieve a user related identification information from a secure RFID enabled document such as an official document, e.g. an electronic passport, or such as an RFID enabled document provided by the network operator, e.g. a value card or voucher or the like. The retrieval of user related identification information from the secure document can, e.g., be protected by means of the requirement of inputting a personal identification number (PIN) or the like other credential that the user knows. The information retrieved from the secure document are either directly transmitted to the telecommunications network 5 or are previously translated or encrypted into the contract related identification information.

According to the present invention, it is advantageously possible that—without any previous contractual or administrative steps—a user can be connected to the telecommunications network 5 by means of a credential-less CPE 10 and the user enjoying an enhanced functionality level (i.e. different to the first initial or reduced functionality level) or service level of the telecommunications network 5 only based on the personal credentials contained in a secure document, the secure document being able to communicate, e.g. via an RFID reader element—either directly or indirectly with the CPE 10.

Figure 6:
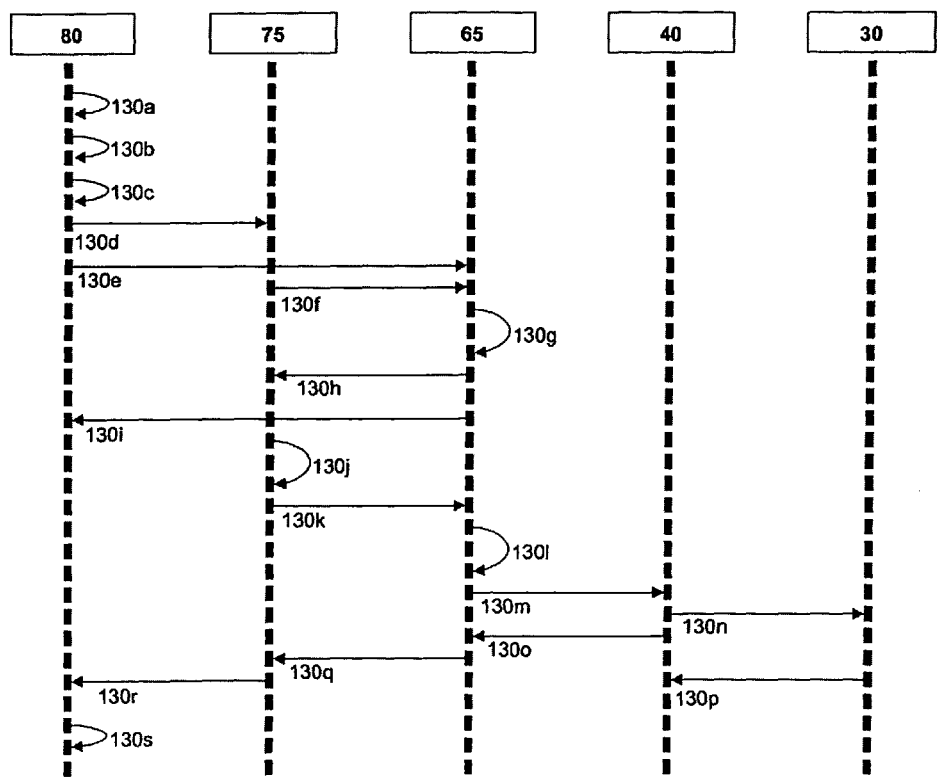
FIGS. 6 and 7 illustrate schematically the federation process and the de-federation process, respectively, according to the present invention by means of a communication diagram.
Figure 7:
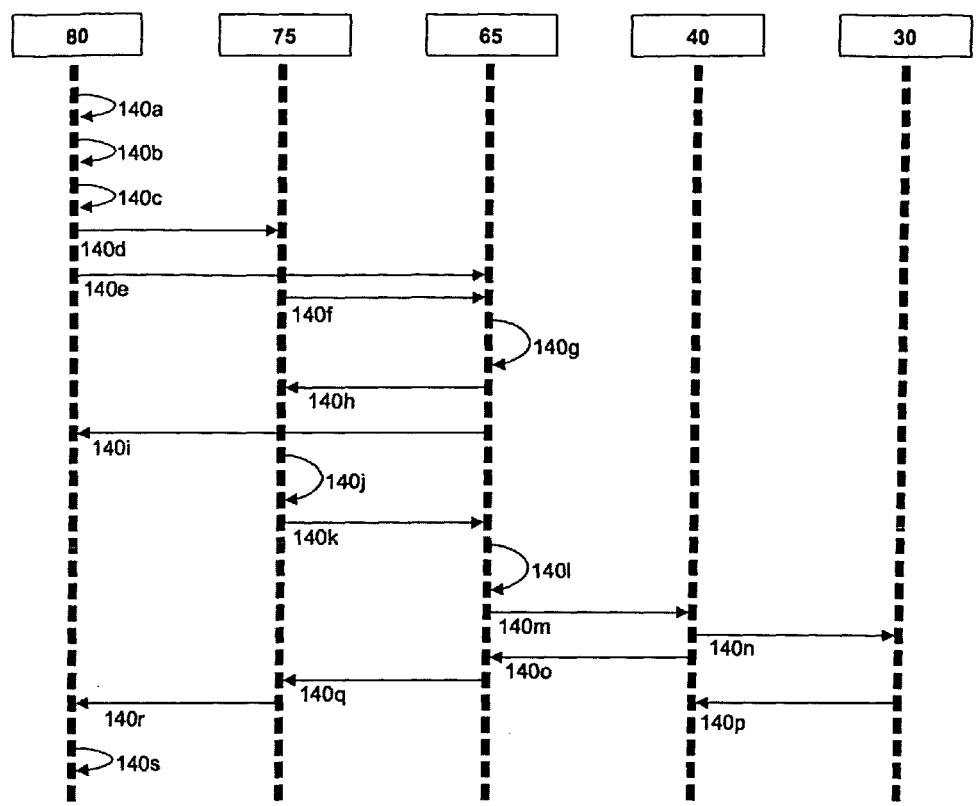

The federation process as well as the de-federation process according to the present invention is schematically shown in FIGS. 6 and 7 by means of a communication diagram.

In FIG. 6, the communication diagram related to performing the federation process is schematically illustrated by means of a multitude of different messages exchanged between the Customer Relation Management function 80, the application IDP 75, the network IDP 65, the control function 40, and the Internet Protocol Edge node 30. The Customer Relation Management function 80 is used to process all orders with respect to the other parts of the telecommunications network.

The federation process requires that a user is registered in the application IDP 75 by means of a user ID and that a current authorization state (e.g. a first functionality level) is stored in the telecommunications network, for example in an operational support system, that indicates which services (e.g. the wallet garden in the (default) first functionality level) are accessible by the CPE 10. The application IDP 75 and the network IDP 65 are able to link (or federate) a line ID (or a handle to a line ID) (that is available in the telecommunications network 5) to a user ID by means of:

storing the line ID (or the handle to the line ID) in the application IDP 75, and to assign a handle to a user ID and to relate this user ID (or handle to the user ID) to the line ID.

In a first step, involving a first message 130*a*, the Customer Relation Management function 80 initiates a federation order. In a second step, involving a processing 130*b*, the Customer Relation Management function 80 searches the line ID information and the user ID information. This is optionally done involving a Customer Self Care function. In a third step, involving a processing 130*c*, the Customer Relation Management function 80 generates a federation order. In a fourth step, involving a fourth message 130*d*, the Customer Relation Management function 80 transmits the federation order information as well as the user ID (or a handle to the user ID) to the application IDP 75. In a fifth step, involving a fifth message 130*e*, Customer Relation Management function 80 transmits the federation order information as well as the line ID (or a handle to the line ID) to the network IDP 65. In a sixth step, involving a sixth message 130*f*, the application IDP 75 transmits the federation request information as well as the order ID and the user ID (or a handle to the user ID) to the network IDP 65. In a seventh step, involving a processing 130*g*, the network IDP 65 takes the line ID (or a handle to the line ID) from the fifth message 130*e* with the same order ID as provided by the application IDP 75 in the sixth message 130*f* and stores the user ID (or a handle to the user ID) provided by the sixth message 130*f* to the line ID (or to a handle to the line ID). In an eighth step, involving an eighth message 130*h*, the network IDP 65 answers the request of the application IDP 75 by means of transmitting the order ID and the line ID (or a handle to the line ID). In a ninth step, involving a ninth message 130*i*, the network IDP 65 answers the request of the Customer Relation Management function 80 by means of transmitting an acknowledgment of the federation. In a tenth step, involving a processing 130*j*, the application IDP 75 takes the user ID (or a handle to the user ID) from the fourth message 130*d* with the same order ID as provided by the network IDP 65 in the eighth message 130*h* and stores the line ID (or a handle to the line ID) provided by the eighth message 130*h* to the user ID (or to a handle to the user ID). In an eleventh step, involving an eleventh message 130*k*, the application IDP 75 transmits, to the network IDP 65, an update information regarding the authorization rights (or the permissions) associated to the line ID. In a twelfth step, involving a processing 130*l*, the network IDP 65 stores the authorization rights (or the permissions) associated to the line ID. In a thirteenth step, involving a thirteenth message 130*m*, the network IDP 65 transmits, to the control function 40, an update information regarding the authorization rights (or the permissions) associated to the line ID. In a fourteenth step, involving a fourteenth message 130*n*, the control function 40 transmits, to the Internet Protocol Edge node 30, an update information regarding the authorization rights (or the permissions) associated to the line ID. In a fifteenth step, involving a fifteenth message 130*o*, the control function 40 acknowledges the update of the authorization state to the network IDP 65. In a sixteenth step, involving a sixteenth message 130*p*, the Internet Protocol Edge node 30 transmits, to the control function 40, an accounting stop information for the existent Internet Protocol session (for the specific line ID and with the old (i.e. prior to the federation process) authorization profile (e.g. according to the first functionality level)) as well as an accounting start information for the new Internet Protocol session with the new authorization profile (e.g. according to the second functionality level). In a seventeenth step, involving a seventeenth message 130*q*, the network IDP 65 acknowledges the update of the authorization state to the application IDP 75. In an eighteenth step, involving an eighteenth message 130*r*, the application IDP 75 acknowledges the federation to the Customer Relation Management function 80. In a nineteenth step, involving a processing 130*s*, the Customer Relation Management function 80 closes the federation order.

According to a further preferred embodiment of the present invention, all the steps including the fifth step (fifth message 130*e*) to the tenth step (processing 130*j*) are omitted and the line ID instead of handles to the line ID are used, and in the fourth step, involving the fourth message 130*d*, the Customer Relation Management function 80 transmits the line ID and the user ID to the application IDP 75 as trigger for the federation instead of the federation order information as well as the user ID (or a handle to the user ID).

This refers, e.g., to a so-called trusted scenario where the transmission of the line ID (i.e. without using a handle) can be regarded as secure, e.g. if transmitted under the control of one network operator.

In FIG. 7, the communication diagram related to performing the de-federation process is schematically illustrated by means of a multitude of different messages exchanged between an Customer Relation Management function 80, the application IDP 75, the network IDP 65, the control function 40, and the Internet Protocol Edge node 30. The Customer Relation Management function 80 is used to process all orders with respect to the other parts of the telecommunications network.

The de-federation process requires that a user is registered in the application IDP 75 by means of a user ID and that a current authorization state (e.g. a second functionality level) is stored in the telecommunications network 5, for example in a operational support system, that indicates which services (e.g. a double play or triple play IP access according to the second functionality level) are accessible by the CPE 10. The application IDP 75 and the network IDP 65 are able to de-link (or de-federate) a line ID (or a handle to a line ID) (that is available in the telecommunications network 5) to a user ID by means of removing a relation between a specific user ID and a specific line ID.

In a first step, involving a first message 140a, the Customer Relation Management function 80 initiates a de-federation order. In a second step, involving a processing 140b, the Customer Relation Management function 80 searches the line ID information and the user ID information. This is optionally done involving a Customer Self Care function. In a third step, involving a processing 140c, the Customer Relation Management function 80 generates a de-federation order. In a fourth step, involving a fourth message 140d, the Customer Relation Management function 80 transmits the de-federation order information as well as the user ID (or a handle to the user ID) to the application IDP 75. In a fifth step, involving a fifth message 140e, the Customer Relation Management function 80 transmits the de-federation order information as well as the line ID (or a handle to the line ID) to the network IDP 65. In a sixth step, involving a sixth message 140f, the application IDP 75 transmits the de-federation request information as well as the order ID and the user ID (or a handle to the user ID) to the network IDP 65. In a seventh step, involving a processing 140g, the network IDP 65 takes the line ID (or a handle to the line ID) from the fifth message 140e with the same order ID as provided by the application IDP 75 in the sixth message 140f and deletes the user ID (or a handle to the user ID) provided by the sixth message 140f from the line ID (or from a handle to the line ID). In an eighth step, involving an eighth message 140h, the network IDP 65 answers the request of the application IDP 75 by means of transmitting the order ID and the line ID (or a handle to the line ID). In a ninth step, involving a ninth message 140i, the network IDP 65 answers the request of the Customer Relation Management function 80 by means of transmitting an acknowledgment of the de-federation. In a tenth step, involving a processing 140j, the application IDP 75 takes the user ID (or a handle to the user ID) from the fourth message 140d with the same order ID as provided by the network IDP 65 in the eighth message 140h and deletes the line ID (or a handle to the line ID) provided by the eighth message 140h from the user ID (or from a handle to the user ID). In an eleventh step, involving an eleventh message 140k, the application IDP 75 transmits, to the network IDP 65, an update information regarding the authorization rights (or the permissions) associated to the line ID. The authorization rights (or permissions) typically correspond to the default profile, i.e. the first functionality level. In a twelfth step, involving a processing 140l, the network IDP 65 stores the authorization rights (or the permissions) associated to the line ID. In a thirteenth step, involving a thirteenth message 140m, the network IDP 65 transmits, to the control function 40, an update information regarding the authorization rights (or the permissions) associated to the line ID. In a fourteenth step, involving a fourteenth message 140n, the control function 40 transmits, to the Internet Protocol Edge node 30, an update information regarding the authorization rights (or the permissions) associated to the line ID. In a fifteenth step, involving a fifteenth message 140o, the control function 40 acknowledges the update of the authorization state to the network IDP 65. In a sixteenth step, involving a sixteenth message 140p, the Internet Protocol Edge node 30 transmits, to the control function 40, an accounting stop information for the existent Internet Protocol session (for the specific line ID and with the old (i.e. prior to the de-federation process) authorization profile (e.g. according to the second functionality level)) as well as an accounting start information for the new Internet Protocol session with the new authorization profile (e.g. according to the first functionality level). In a seventeenth step, involving a seventeenth message 140q, the network IDP 65 acknowledges the update of the authorization state to the application IDP 75. In an eighteenth step, involving an eighteenth message 140r, the application IDP 75 acknowledges the de-federation to the Customer Relation Management function 80. In a nineteenth step, involving a processing 140s, the Customer Relation Management function 80 closes the de-federation order.

According to a further preferred embodiment of the present invention, all the steps including the fifth step (fifth message 140e) to the tenth step (processing 140j) are omitted and the line ID instead of handles to the line ID are used, and in the fourth step, involving the fourth message 140d, the Customer Relation Management function 80 transmits the line ID and the user ID to the application IDP 75 as trigger for the de-federation instead of the de-federation order information as well as the user ID (or a handle to the user ID).

This refers, e.g., to a so-called trusted scenario where the transmission of the line ID (i.e. without using a handle) can be regarded as secure, e.g. if transmitted under the control of one network operator.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B." Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise.

The invention claimed is:

1. A method for efficient connection between a telecommunications network and a Customer Premises Equipment (CPE) via an access node, the method comprising the steps of:

establishing a physical communication channel between the access node of the telecommunications network and the CPE, the physical communication channel being assigned to a network access related identification information related to the access node;

providing, by the telecommunications network, a public or private Interne Protocol address to the CPE for use by the CPE to communicate with an Internet Protocol Edge node of the telecommunications network, the Internet Protocol address being associated with the network access related identification information and an Internet Protocol session or connection realizing a logical communication channel being initiated between the Internet Protocol Edge node of the telecommunications network and the CPE;

initially assigning, by the telecommunications network, a first functionality level to the public or private Internet Protocol address; and assigning, by the telecommunications network, a second functionality level to the public or private Internet Protocol address when the telecommunications network is able to federate the network access related identification information to a contract related identification information;

wherein the logical communication channel is established by using at least one piece of authentication information, the at least one piece of authentication information being a trusted information existing within the telecommunications network;

wherein the at least one piece of authentication information is independent from the CPE, and wherein the at least one piece of authentication information is related solely to either the access node or to other parts of the telecommunications network.

2. A method for efficient connection between a telecommunications network and a Customer Premises Equipment (CPE) via an access node, the method comprising the steps of:

establishing a physical communication channel between the access node of the telecommunications network and the CPE, the physical communication channel being assigned to a network access related identification information related to the access node;

providing, by the telecommunications network, a public or private Internet Protocol address to the CPE for use by the CPE to communicate with an Internet Protocol Edge node of the telecommunications network, the Internet Protocol address being associated with the network access related identification information and an Internet Protocol session or connection realizing a logical communication channel being initiated between the Internet Protocol Edge node of the telecommunications network and the CPE;

initially assigning, by the telecommunications network, a first functionality level to the public or private Internet Protocol address; and assigning, by the telecommunications network, a second functionality level to the public or private Internet Protocol address when the telecommunications network is able to federate the network access related identification information to a contract related identification information;

wherein the logical communication channel is established by using at least one piece of authentication information, the at least one piece of authentication information being a trusted information existing within the telecommunications network;

wherein the network access related identification information is at least one of a port ID information or a line ID information, and wherein the contract related identification information corresponds to a user.

3. A method for efficient connection between a telecommunications network and a Customer Premises Equipment (CPE) via an access node, the method comprising the steps of:

establishing a physical communication channel between the access node of the telecommunications network and the CPE, the physical communication channel being assigned to a network access related identification information related to the access node;

providing, by the telecommunications network, a public or private Internet Protocol address to the CPE for use by the CPE to communicate with an Internet Protocol Edge node of the telecommunications network, the Internet Protocol address being associated with the network access related identification information and an Internet Protocol session or connection realizing a logical communication channel being initiated between the Internet Protocol Edge node of the telecommunications network and the CPE;

initially assigning, by the telecommunications network, a first functionality level to the public or private Internet Protocol address; and assigning, by the telecommunications network, a second functionality level to the public or private Internet Protocol address when the telecommunications network is able to federate the network access related identification information to a contract related identification information;

wherein the logical communication channel is established by using at least one piece of authentication information, the at least one piece of authentication information being a trusted information existing within the telecommunications network;

wherein the telecommunications network comprises an Internet Protocol Edge node and a control function, wherein the contract related identification information, to enable the second functionality level, is sent to the control function after relating the network access related identification information to the contract related identification information.

4. A method for efficient connection between a telecommunications network and a Customer Premises Equipment (CPE) via an access node, the method comprising the steps of:

establishing a physical communication channel between the access node of the telecommunications network and the CPE, the physical communication channel being assigned to a network access related identification information related to the access node;

providing, by the telecommunications network, a public or private Internet Protocol address to the CPE for use the CPE to communicate with an Internet Protocol Edge node of the telecommunications network, the Internet Protocol address being associated with the network access related identification information and an Internet Protocol session or connection realizing a logical communication channel being initiated between the internet Protocol Edge node of the telecommunications network and the CPE;

initially assigning, by the telecommunications network, a first functionality level to the public or private Internet Protocol address; and assigning, by the telecommunications network, a second functionality level to the public or private Internet Protocol address when the telecommunications network is able to federate the network access related identification information to a contract related identification information;

wherein the logical communication channel is established by using at least one piece of authentication information, the at least one piece of authentication information being a trusted information existing within the telecommunications network;

wherein the Internet Protocol Edge node controls the communication between the CPE and the Internet Protocol Edge Node via the access node of the telecommunications network according to the first or second functionality level, wherein the functionality level associated with the network access related identification information is changed based on information received from the control function.

5. A method for efficient connection between a telecommunications network and a Customer Premises Equipment (CPE) via an access node, the method comprising the steps of:

establishing a physical communication channel between the access node of the telecommunications network and the CPE, the physical communication channel being assigned to a network access related identification information related to the access node;

providing, by the telecommunications network, a public or private Internet Protocol address to the CPE for use by the CPE to communicate with an Internet Protocol Edge node of the telecommunications network, the Internet Protocol address being associated with the network access related identification information and an Internet Protocol session or connection realizing a logical communication channel being initiated between the Internet Protocol Edge node of the telecommunications network and the CPE;

initially assigning, by the telecommunications network, a first functionality level to the public or private Internet Protocol address; and assigning, by the telecommunications network, a second functionality level to the public or private Internet Protocol address when the telecommunications network is able to federate the network access related identification information to a contract related identification information;

wherein the logical communication channel is established by using at least one piece of authentication information, the at least one piece of authentication information being a trusted information existing within the telecommunications network;

wherein the telecommunications network comprises an operation support system and a data check function, wherein the method further comprising performing a data integrity check, wherein performing the data integrity check comprises the following steps:

contacting, by the CPE, the data check function;

retrieving, by the data check function, from the CPE, at least one integrity check information out of the following: the serial number of the CPE or of an associated device, or MAC (Medium Access Control) addresses of the CPE or of an associated device;

retrieving, by the data check function, from a control function, network access related identification information and network port identification information related to the Internet Protocol session or connection the CPE is connected to; and transmitting the integrity check information to the operation support system.

6. A method for efficient connection between a telecommunications network and a Customer Premises Equipment (CPE) via an access node, the method comprising the steps of:

establishing a physical communication channel between the access node of the telecommunications network and the CPE, the physical communication channel being assigned to a network access related identification information related to the access node;

providing, by the telecommunications network, a public or private Internet Protocol address to the CPE for use by the CPE to communicate with an Internet Protocol Edge node of the telecommunications network, the Internet Protocol address being associated with the network access related identification information and an Internet Protocol session or connection realizing a logical communication channel being initiated between the Internet Protocol edge node of the telecommunications network and the CPE;

initially assigning, by the telecommunications network, a first functionality level to the public or private Internet Protocol address; and assigning, by the telecommunications network, a second functionality level to the public or private Internet Protocol address when the telecommunications network is able to federate the network access related identification information to a contract related identification information;

wherein the logical communication channel is established by using at least one piece of authentication information, the at least one piece of authentication information being a trusted information existing within the telecommunications network;

wherein the contract related identification information is a user related identification information.

7. A method for efficient connection between a telecommunications network and a Customer Premises Equipment (CPE) via an access node, the method comprising the steps of:

establishing a physical communication channel between the access node of the telecommunications network and the CPE, the physical communication channel being assigned to a network access related identification information related to the access node;

providing, by the telecommunications network, a public or private Internet Protocol address to the CPE for use by the CPE to communicate with an Internet Protocol Edge node of the telecommunications network, the Internet Protocol address being associated with the network access related identification information and an Internet Protocol session or connection realizing a logical communication channel being initiated between the Internet Protocol edge node of the telecommunications network and the CPE;

initially assigning, by the telecommunications network, a first functionality level to the public or private Internet Protocol address; and assigning, by the telecommunications network, a second functionality level to the public or private Internet Protocol address when the telecommunications network is able to federate the network access related identification information to a contract related identification information;

wherein the logical communication channel is established by using at least one piece of authentication information, the at least one piece of authentication information being a trusted information existing within the telecommunications network;

wherein the telecommunications network comprises an operation support system and a network identity provider;

wherein the establishment of the physical communication channel between the access node of the telecommunications network and the CPE, and the initial assignment of the first functionality level to the public or private Internet Protocol address, further comprises:
- establishing a management communication channel between the access node and the operation support system;
- transmitting to the operation support system the corresponding line ID, port ID, and maximum bandwidth physically possible at the corresponding network port;
- determining, by the operation support system, the technical status and the logical status of the corresponding network port;
- transmitting, to a network IDP (identity provider), the corresponding line ID, technical status and logical status, and the location information related to the physical communication channel; and
- generating a network port entry at a control function and transmitting authorization information specifying the first functionality level for a public or private Internet Protocol address managed by the Internet Protocol Edge node and usable via the network port of the access node of the telecommunications network.

8. A telecommunications network, provided for efficient connection between the telecommunications network and a CPE via, an access node, comprising:
- a plurality of network nodes; and
- a physical communication channel between the access node of the telecommunications network and the CPE, the physical communication link being associated to a network access related identification information related to the access node;
- wherein the telecommunications network is configured to provide a public or private Internet Protocol address to the CPE for use by the CPE to communicate with an Internet Protocol Edge node, the Internet Protocol address being associated with the network access related identification information and an Internet Protocol session or connection realizing a logical communication channel being initiated between the Internet Protocol Edge node of the telecommunications network and the CPE;
- wherein the telecommunications network is configured to initially assign a first functionality level to the public or private Internet Protocol address;
- wherein the telecommunications network is configured to assign a second functionality level to the public or private Internet Protocol address when the telecommunications network is able to federate the network access related identification information to a contract related identification information; and
- wherein the logical communication channel is established by using at least one piece of authentication information, the at least one piece of authentication information being a trusted information existing within the telecommunications network;
- wherein the telecommunications network comprises a control function, and wherein the telecommunications network is configured such that contract related identification information to enable the second functionality level is sent to the control function after the network access related identification information to the contract related identification information.

9. A telecommunications network provided for efficient initialization of an access node in the telecommunications network, the telecommunications network comprising:
- a plurality of network nodes;
- an operation support system;
- a network identity provider (IDP); and
- the access node, configured to provide a plurality of network ports;
- wherein the telecommunications network is configured to establish a management communication channel between the access node and the operation support system;
- wherein for at least part of the network ports of the access node, the telecommunications network is configured to provide:
  - a transmission to the operation support system of the corresponding line ID, port ID, and maximum bandwidth physically possible at the corresponding network port;
  - a determination by the operation support system of the technical status and of the logical status of the corresponding network port;
  - a transmission to the network IDP of the technical status and logical status, and the location information related to the physical communication channel.

* * * * *